(12) United States Patent
Hosen et al.

(10) Patent No.: US 9,863,464 B2
(45) Date of Patent: Jan. 9, 2018

(54) DUST COVER

(71) Applicant: NOK CORPORATION, Tokyo (JP)

(72) Inventors: Tatsuro Hosen, Fujisawa (JP); Koji Kanagawa, Makinohara (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/518,841

(22) PCT Filed: Oct. 19, 2015

(86) PCT No.: PCT/JP2015/079440
§ 371 (c)(1),
(2) Date: Apr. 13, 2017

(87) PCT Pub. No.: WO2016/063832
PCT Pub. Date: Apr. 28, 2016

(65) Prior Publication Data
US 2017/0234361 A1 Aug. 17, 2017

(30) Foreign Application Priority Data

Oct. 22, 2014 (JP) .................................. 2014-215325
Nov. 19, 2014 (JP) .................................. 2014-234307

(51) Int. Cl.
*F16C 11/06* (2006.01)
*F16J 15/52* (2006.01)

(52) U.S. Cl.
CPC ........... *F16C 11/0671* (2013.01); *F16J 15/52* (2013.01)

(58) Field of Classification Search
CPC .............. F16C 11/0666; F16C 11/0676; F16C 11/0671; F16J 3/04; F16J 3/042; F16J 15/52; Y10T 403/315; Y10T 403/32729
See application file for complete search history.

(56) References Cited

U.S. PATENT DOCUMENTS 4,322,175 A * 3/1982 Szczesny ................ F16B 21/20
277/635
5,066,159 A * 11/1991 Urbach ............... F16C 11/0666
277/635

(Continued)

FOREIGN PATENT DOCUMENTS

DE 102011052532 A1 * 2/2013 ............... F16J 3/042
EP 1010905 A1 * 6/2000 .......... F16C 11/0671

(Continued)

*Primary Examiner* — Daniel J Wiley
(74) *Attorney, Agent, or Firm* — Harness, Dickey & Pierce, P.L.C.

(57) ABSTRACT

A dust cover in which an improvement in sealing performance is achieved. A dust cover 100 used in a ball joint includes a seal main body made of an elastic body and integrally having a body portion 110, a fixed portion 130 that is provided on one end side of the body portion 110, and a seal portion 120 that is provided on the other end side of the body portion 110, and an annular auxiliary seal 150 made of resin and provided in the seal portion 120. The seal portion 120 includes an inner peripheral seal portion and a dust lip 122, and the auxiliary seal 150 includes an auxiliary inner peripheral seal portion 151, an auxiliary dust seal portion, and a supported portion 153 that is supported by a collar fixed to a shaft portion on an opposite side to the auxiliary dust seal portion in an axial direction.

8 Claims, 14 Drawing Sheets

(56) References Cited

U.S. PATENT DOCUMENTS

| | | | | |
|---|---|---|---|---|
| 6,308,959 B1* | 10/2001 | Sokolihs | | F16J 3/046 |
| | | | | 277/394 |
| 6,334,620 B1* | 1/2002 | Reetz | | B60G 7/005 |
| | | | | 277/560 |
| 6,814,521 B2* | 11/2004 | Suzuki | | B60G 7/005 |
| | | | | 277/635 |
| 6,834,863 B2* | 12/2004 | Urbach | | F16C 11/0671 |
| | | | | 277/555 |
| 8,414,215 B2* | 4/2013 | Langendoen | | F16C 11/0676 |
| | | | | 277/635 |
| 9,206,837 B2* | 12/2015 | Ishimori | | F16C 11/06 |
| 9,221,225 B2* | 12/2015 | Idies | | F16C 11/06 |
| 9,254,867 B2* | 2/2016 | Hosen | | F16C 11/0671 |
| 9,528,547 B2* | 12/2016 | Hosen | | F16J 3/042 |
| 2003/0202842 A1 | 10/2003 | Abels | | |
| 2005/0042022 A1 | 2/2005 | Abels et al. | | |
| 2007/0231060 A1* | 10/2007 | Abels | | F16C 11/0671 |
| | | | | 403/76 |
| 2009/0047063 A1* | 2/2009 | Shirai | | F16C 11/0604 |
| | | | | 403/133 |
| 2009/0209353 A1* | 8/2009 | Abels | | B29C 45/2612 |
| | | | | 464/106 |
| 2011/0222959 A1* | 9/2011 | Beutler | | F16C 11/0671 |
| | | | | 403/122 |
| 2015/0030376 A1* | 1/2015 | Shimazawa | | F16C 11/0671 |
| | | | | 403/134 |
| 2015/0300502 A1 | 10/2015 | Hosen | | |

FOREIGN PATENT DOCUMENTS

| | | | | |
|---|---|---|---|---|
| EP | 2012028 A2 * | 1/2009 | | F16C 11/0671 |
| JP | H03-032211 U | 3/1991 | | |
| JP | H07-019621 U | 4/1995 | | |
| JP | H08-200517 A | 8/1996 | | |
| JP | H09-158941 A | 6/1997 | | |
| JP | H11-63245 A | 3/1999 | | |
| JP | 2004-519637 A | 7/2004 | | |
| JP | 2005-536700 A | 12/2005 | | |
| JP | 2007532831 A | 11/2007 | | |
| JP | 2014-084967 A | 5/2014 | | |
| JP | 2014-181741 A | 9/2014 | | |
| WO | 2014-020980 A1 | 2/2014 | | |
| WO | WO-2015186441 A1 * | 12/2015 | | F16C 11/06 |
| WO | WO-2016027590 A1 * | 2/2016 | | F16J 3/04 |

* cited by examiner

DUST COVER

CROSS-REFERENCE TO RELATED APPLICATIONS

This application is a National Stage of International Application No. PCT/2015/079440, filed Oct. 19, 2015, which claims priority to Japanese Application No. 2014-234307, filed Nov. 19, 2014 and Japanese Application No. 2014-215325, filed Oct. 22, 2014. The entire disclosures of each of the above applications are incorporated herein by reference.

FIELD

The present disclosure relates to a dust cover used in a ball joint provided in various devices of a vehicle or the like.

BACKGROUND

Conventionally, in a ball joint provided in various devices of a vehicle or the like, a dust cover is used in order to prevent entry of water, dust, etc. into a joint portion and prevent an outflow of grease from the joint portion. The dust cover used in the ball joint according to a prior art will be described with reference to FIG. 14. FIG. 14 is a schematic cross-sectional view of the ball joint and the dust cover mounted to the ball joint according to the prior art.

The ball joint includes a ball stud 300 that has a spherical portion at one end of a shaft portion, a socket 200 that rotatably and swingably supports the ball stud 300, and a knuckle 400 that is fixed to an opposite side of the shaft portion to the spherical portion. A dust cover 700 includes a seal main body made of an elastic body and integrally having a deformable film-like body portion 710, a fixed portion 730 that is provided on one end side of the body portion 710 and is fixed to the socket 200, and a seal portion 720 that is provided on the other end side of the body portion 710. Herein, the seal portion 720 includes an inner peripheral seal portion 721 that is provided so as to be slidable on the shaft portion in the ball stud 300, and a dust seal portion 722 that is provided so as to be slidable on the knuckle 400.

In addition, in the seal portion 720, a reinforcing ring 750 made of metal or resin is buried. Thus, by burying the reinforcing ring 750 in the seal portion 720, it becomes possible to improve sealing performance by the inner peripheral seal portion 721 and the dust seal portion 722.

Herein, for example, as shown in FIG. 14, in a state in which the ball stud 300 is tilted to the left in the drawing, the left part of the body portion 710 in the drawing is compressed, and the right part thereof in the drawing is extended. With this, in the right part in the drawing, a force acts on the inner peripheral seal portion 721 such that the inner peripheral seal portion 721 is caused to move away from the shaft portion in the ball stud 300, and a force acts on the dust seal portion 722 such that the dust seal portion 722 is caused to move away from the knuckle 400. As described above, by burying the reinforcing ring 750 in the seal portion 720, the inner peripheral seal portion 721 is prevented from moving away from the shaft portion, and the dust seal portion 722 is prevented from moving away from the knuckle 400.

However, in a low temperature environment, elasticity of each of the inner peripheral seal portion 721 and the dust seal portion 722 that are made of rubber is significantly lost. In addition, with a permanent set resulting from compressive deformation at a low temperature, gaps may be formed between the inner peripheral seal portion 721 and the shaft portion in the ball stud 300 and between the dust seal portion 722 and the knuckle 400. With this, a sealing function may be reduced.

Note that it is possible to more reliably prevent the inner peripheral seal portion 721 from moving away from the shaft portion in the ball stud 300 by reducing the inner diameter of the reinforcing ring 750. However, as the inner diameter of the reinforcing ring 750 is reduced, a pressing force to the shaft portion by the inner peripheral seal portion 721 is increased correspondingly, and it becomes difficult for the inner peripheral seal portion 721 to slide on the shaft portion. With this, there arises a new problem that the film-like body portion 710 is twisted. Accordingly, the measure by reducing the inner diameter of the reinforcing ring 750 has limitations.

CITATION LIST

Patent Literature

[PTL 1] Japanese Patent Application Laid-open No. H9-158941

[PTL 2] Japanese Utility Model Application Laid-open No. H7-19621

[PTL 3] Japanese Patent Application Laid-open No. H8-200517

[PTL 4] Japanese Translation of PCT Application No. 2007-532831

[PTL 5] Japanese Utility Model Application Laid-open No. H3-32211

[PTL 6] Japanese Patent Application Laid-open No. H11-63245

[PTL 7] WO 2014/020980

SUMMARY

Technical Problem

An object of the present disclosure is to provide a dust cover in which an improvement in sealing performance is achieved.

Solution to Problem

The present disclosure has adopted the following means in order to solve the above problem.

That is, the dust cover of the present disclosure is a dust cover used in a ball joint including (a) a ball stud that has a spherical portion at one end of a shaft portion; (b) a socket that has a bearing of the spherical portion and rotatably and swingably supports the ball stud; and (c) an annular member that is fixed on an opposite side of the shaft portion to the spherical portion (or a coupling member that couples to the shaft portion on an opposite side of the shaft portion to the spherical portion), the dust cover including (d) a seal main body made of an elastic body and integrally having (d1) a deformable body portion; (d2) a fixed portion that is provided on one end side of the body portion and is fixed to the socket; and (d3) a seal portion that is provided on another end side of the body portion and is provided so as to be slidable on the shaft portion (the present disclosure includes the case of another member provided on the outer peripheral surface of the shaft portion in addition to the shaft portion itself in the ball stud; the same applies to the following description) and the annular member (or the coupling member); and (e) an annular auxiliary seal made of resin and provided in the seal portion, wherein the seal portion includes: (d3-1) an inner peripheral seal portion that is slidable on an outer peripheral surface of the shaft portion; and (d3-2) a dust seal portion that is slidable on an end surface of the annular member (or the coupling member), and the auxiliary seal includes: (e1) an auxiliary inner peripheral seal portion that is slidable on the outer peripheral surface of the shaft portion; (e2) an auxiliary dust seal portion that is slidable on the end surface of the annular member (or the coupling member); and (e3) a supported portion that is supported by a fixed member fixed to the shaft portion on an opposite side to the auxiliary dust seal portion in an axial direction (the present disclosure includes the case where the fixed member is provided integrally with the shaft portion).

According to the present disclosure, since the auxiliary seal made of resin is provided, even in a state in which the sealing function of the seal portion in the seal main body made of an elastic body is not adequately exerted in a low temperature environment or the like, sealing performance is maintained by the auxiliary seal.

In addition, in the auxiliary seal, the inner peripheral surface side and both end sides in the axial direction are supported. That is, the auxiliary inner peripheral seal portion is slidably in contact with the shaft portion in the ball stud on the inner peripheral surface side of the auxiliary seal, and hence the inner peripheral surface side of the auxiliary seal is supported by the shaft portion. On one end side in the axial direction in the auxiliary seal, the auxiliary dust seal portion is slidably in contact with the end surface of the annular member fixed to the shaft portion (or the coupling member that couples to the shaft portion on the opposite side of the shaft portion to the spherical portion). Accordingly, one end side of the auxiliary seal is supported by the annular member (or the coupling member). In addition, on the other end side in the axial direction in the auxiliary seal, the supported portion is supported by the fixed member fixed to the shaft portion. Consequently, the attitude of the auxiliary seal with respect to the ball stud and the annular member (or the coupling member) is stably maintained irrespective of the attitude of the ball stud with respect to the socket. With this, the sealing performance by the auxiliary seal is stably exerted irrespective of the attitude of the ball stud with respect to the socket.

In addition, the attitude of the auxiliary seal with respect to the ball stud and the annular member (or the coupling member) is stably maintained, whereby the attitude of the seal portion in the seal main body with respect to the ball stud and the annular member (or the coupling member) is also stably maintained. With this, the sealing performance by the seal portion is also stably exerted irrespective of the attitude of the ball stud with respect to the socket.

A plurality of slits may be formed on the opposite side of the auxiliary seal to the auxiliary dust seal portion in the axial direction, and a part that is provided with the inner peripheral seal portion and a part that is provided with the dust seal portion in the seal portion may be connected to each other via the slits.

By adopting this configuration, it is possible to provide the auxiliary seal made of resin that includes the auxiliary inner peripheral seal portion and the auxiliary dust seal portion in the seal portion made of an elastic body that includes the inner peripheral seal portion and the dust seal portion.

A resin material used for the auxiliary seal may be higher in low temperature resistance than a rubber material used for the seal main body.

With this, even when the sealing performance of the seal portion in the seal main body is reduced in the low temperature environment, the sealing performance of the auxiliary seal is maintained.

In addition, another dust cover of the present disclosure is a dust cover used in a ball joint including: (a) a ball stud that has a spherical portion at one end of a shaft portion; (b) a socket that has a bearing of the spherical portion and rotatably and swingably supports the ball stud; and (c) an annular member that is fixed on an opposite side of the shaft portion to the spherical portion (or a coupling member that couples to the shaft portion on an opposite side of the shaft portion to the spherical portion), the dust cover including (d) a seal main body made of an elastic body and integrally having: (d1) a deformable body portion; (d2) a fixed portion that is provided on one end side of the body portion and is fixed to the socket; and (d3) a seal portion that is provided on another end side of the body portion and is provided so as to be slidable on the shaft portion (the present disclosure includes the case of another member provided on the outer peripheral surface of the shaft portion in addition to the shaft portion itself in the ball stud. The same applies to the following description.) and the annular member (or the coupling member); and (e) a reinforcing ring made of resin or metal and provided in the seal portion, wherein the seal portion includes: (d3-1) an inner peripheral seal portion that is slidable on an outer peripheral surface of the shaft portion; and (d3-2) a dust seal portion that is slidable on an end surface of the annular member (or the coupling member), wherein the inner peripheral seal portion has (d3-1-1) a first inner peripheral convex portion that is slidable on the outer peripheral surface of the shaft portion; and (d3-1-2) a second inner peripheral convex portion that is provided adjacent to the first inner peripheral convex portion and closer to the one end side than the first inner peripheral convex portion, and is slidable on the outer peripheral surface of the shaft portion, the reinforcing ring includes: (e1) a supported portion that is supported by a fixed member fixed to the shaft portion on the one end side (the present disclosure includes the case where the fixed member is provided integrally with the shaft portion); and (e2) an inward flange portion that is provided on the other end side and is buried in the seal portion, wherein a tip of the inward flange portion is provided so as to be positioned between a radially inward foremost end portion of the first inner peripheral convex portion and a radially inward foremost end portion of the second inner peripheral convex portion in an axial direction.

According to the present disclosure, in the reinforcing ring provided in the seal portion, the supported portion that is supported by the fixed member fixed to the shaft portion is provided. Consequently, it is possible to stably maintain the attitude of the seal portion with respect to the ball stud and the annular member (or the coupling member) irrespective of the attitude of the ball stud with respect to the socket. With this, the sealing performance by the seal portion is stably exerted irrespective of the attitude of the ball stud with respect to the socket. In addition, the tip of the inward flange portion is provided so as to be positioned between the radially inward foremost end portion of the first inner peripheral convex portion and the radially inward foremost end portion of the second inner peripheral convex portion in the axial direction. With this, it is possible to prevent a pressing force to the shaft portion by the first inner peripheral convex portion and the second inner peripheral convex portion from becoming excessively large. Consequently, it is possible to prevent sliding resistance between the first and second inner peripheral convex portions and the shaft portion from becoming excessively large while exerting the sealing performance by the first inner peripheral convex portion and the second inner peripheral convex portion.

A difference between an outer diameter of a part of the shaft portion on which the second inner peripheral convex portion slides and an inner diameter of the tip of the inward flange portion may be larger than a difference between the outer diameter and an inner diameter of the radially inward foremost end portion of the second inner peripheral convex portion.

With this, it becomes possible to increase the thickness of a part of the seal main body that covers the tip of the inward flange portion to a certain degree while preventing the sliding resistance by the second inner peripheral convex portion from becoming excessively large. With this, it is possible to prevent a reduction in moldability when the seal main body is molded.

The dust seal portion may have a dust lip that extends radially outwardly toward a surface side of the annular member (or the coupling member), and the dust lip may satisfy $0.45 \leq T \div L \leq 0.6$, where T represents a width of a base of the dust lip, and L represents a length of the dust lip.

With this, it is possible to stabilize the sealing performance by the dust lip for a long time period.

Note that the individual configurations described above may be adopted by being combined together whenever possible.

Advantageous Effects of the Disclosure

Thus, according to the present disclosure, it is possible to improve the sealing performance.

DRAWINGS

DETAILED DESCRIPTION

Hereinbelow, with reference to the drawings, a mode for carrying out the disclosure will be illustratively described in detail based on embodiments. It should be noted that, however, unless otherwise specified expressly, the dimensions, materials, shapes, relative arrangements of components, etc. described in these embodiments are not intended to limit the scope of the present disclosure to the dimensions, materials, shapes, and relative arrangements thereof.

Embodiment 1

Figure 1:
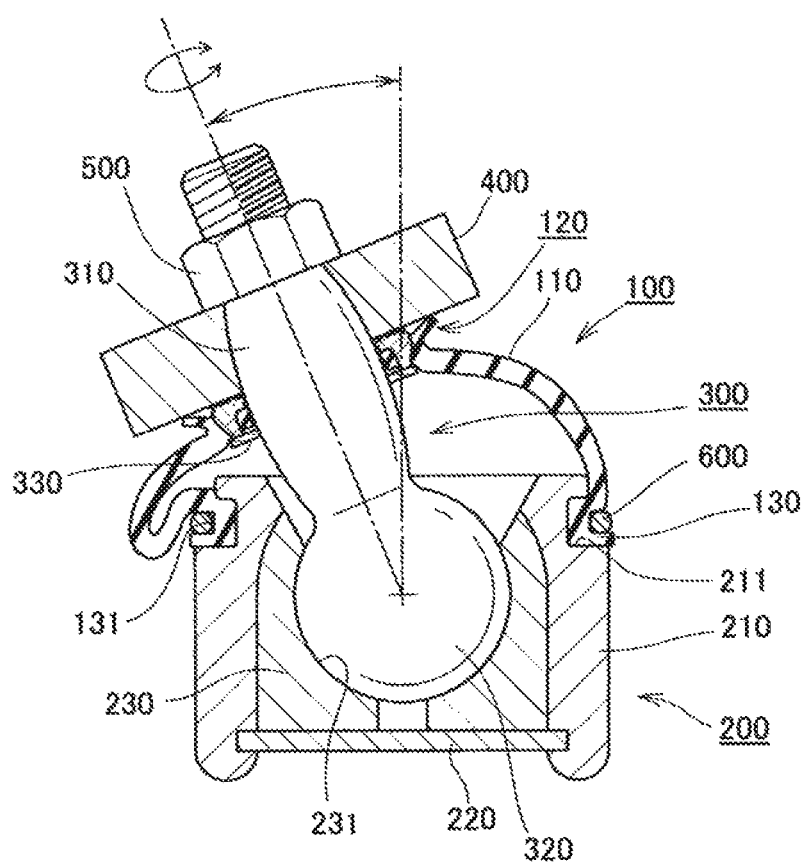
FIG. 1 is a schematic cross-sectional view of a ball joint and a dust cover mounted to the ball joint according to Embodiment 1 of the present disclosure.
Figure 2:
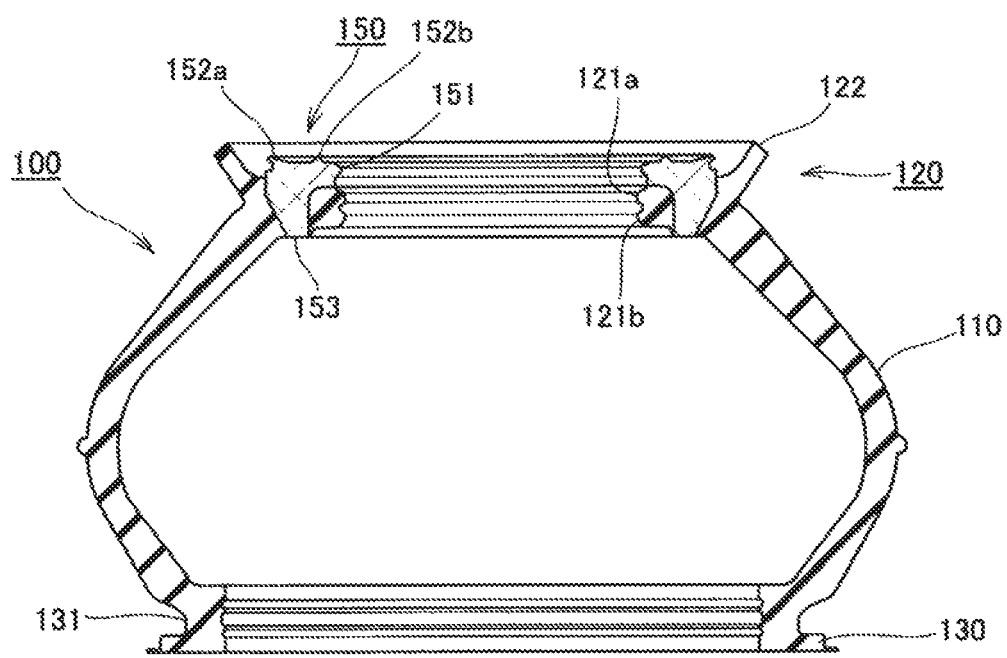
FIG. 2 is a schematic cross-sectional view of the dust cover according to Embodiment 1 of the present disclosure.
Figure 3:
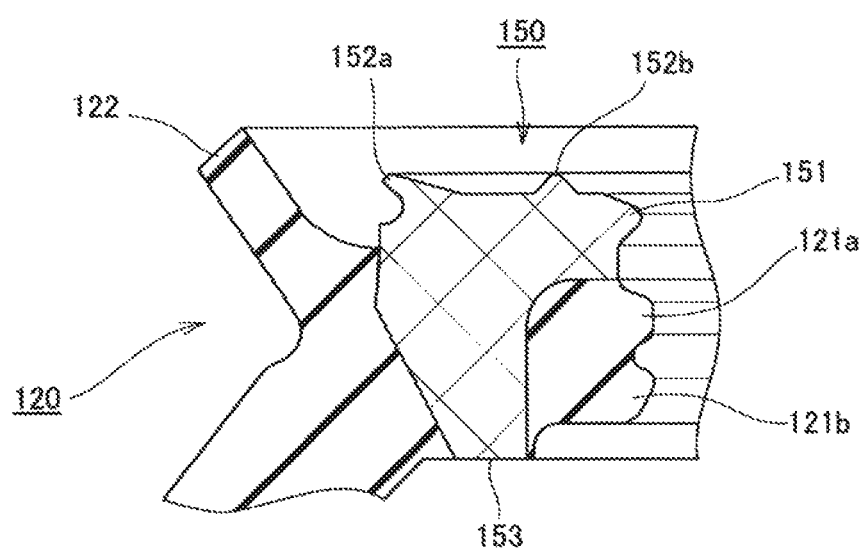
FIG. 3 is a schematic cross-sectional view in which a part in the vicinity of a seal portion in the dust cover according to Embodiment 1 of the present disclosure is enlarged.
Figure 4:
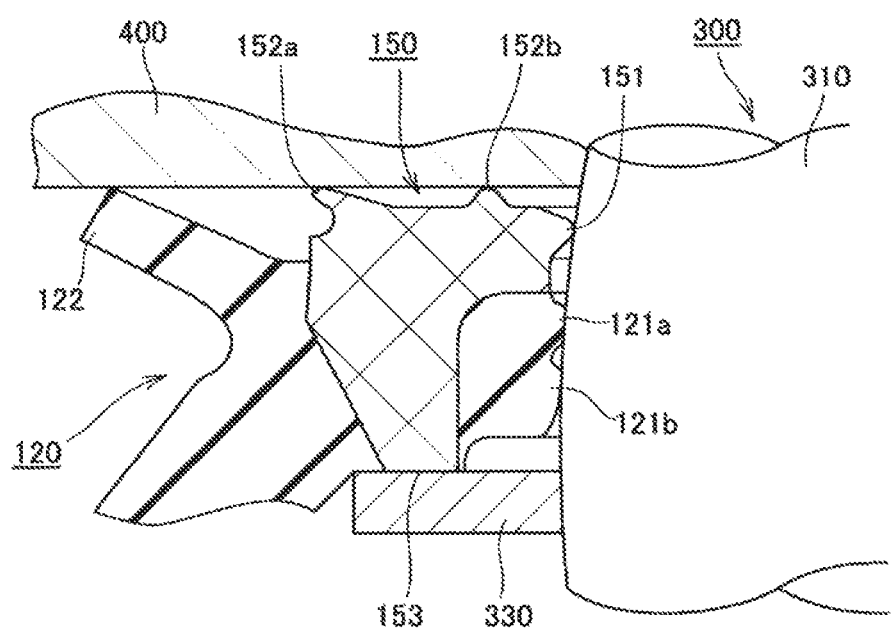
FIG. 4 is a schematic cross-sectional view in which the part in the vicinity of the seal portion in the dust cover is enlarged in a state in which the dust cover according to Embodiment 1 of the present disclosure is mounted to the ball joint.
Figure 5:
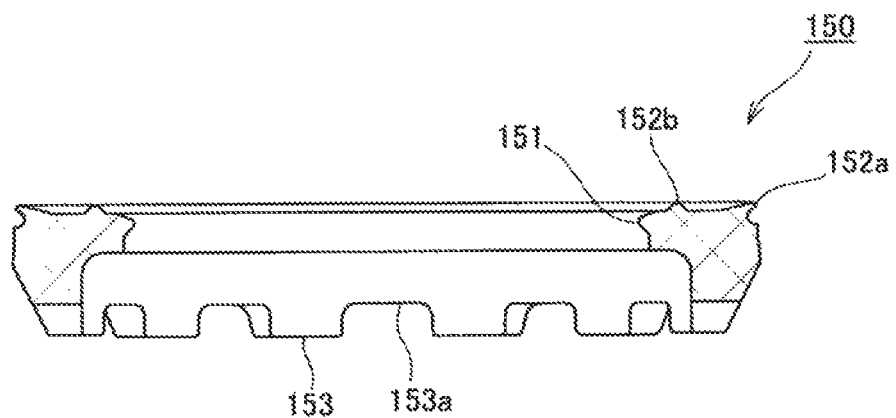
FIG. 5 is a schematic cross-sectional view of an auxiliary seal according to Embodiment 1 of the present disclosure.

With reference to FIGS. 1 to 5, a dust cover according to Embodiment 1 of the present disclosure will be described. FIG. 1 is a schematic cross-sectional view of a ball joint and the dust cover mounted to the ball joint according to Embodiment 1 of the present disclosure. Note that FIG. 1 shows the cross-sectional view obtained by cutting using a plane that includes the central axis of a shaft portion of a ball stud provided in the ball joint. FIG. 2 is a schematic cross-sectional view of the dust cover according to Embodiment 1 of the present disclosure. FIG. 2 shows the cross-sectional view obtained by cutting using a plane that includes the central axis of the annular dust cover in a state in which the dust cover is not deformed. FIG. 3 is a partially enlarged view of FIG. 2, and is a schematic cross-sectional view in which a part in the vicinity of a seal portion in the dust cover according to Embodiment 1 of the present disclosure is enlarged. FIG. 4 is a partially enlarged view of FIG. 1, and is a schematic cross-sectional view in which the part in the vicinity of the seal portion in the dust cover is enlarged in a state in which the dust cover according to Embodiment 1 of the present disclosure is mounted to the ball joint. FIG. 5 is a schematic cross-sectional view of an auxiliary seal according to Embodiment 1 of the present disclosure. Note that FIG. 5 shows the cross-sectional view obtained by cutting using a plane that includes the central axis in the annular auxiliary seal.

<Ball Joint>

With reference particularly to FIG. 1, an example of the ball joint to which the dust cover according to the present embodiment can be applied will be described. The ball joint includes a ball stud 300 that has a spherical portion 320 at one end of a shaft portion 310, a socket 200 that rotatably and swingably supports the ball stud 300, and a knuckle 400 as an annular member that is fixed to an opposite side of the shaft portion 310 to the spherical portion 320. Note that the knuckle 400 corresponds to a coupling member that couples to the shaft portion 310 on the opposite side of the shaft portion 310 to the spherical portion 320. The socket 200 includes an annular case 210, a bottom plate 220 that is fixed to the bottom side of the case 210, and a bearing 230 of the spherical portion 320. The bearing 230 has a bearing surface 231 that is constituted by a spherical surface having the same radius as the curvature radius of the spherical portion 320. The knuckle 400 is provided in a vehicle body or the like, and the shaft portion 310 of the ball stud 300 is fixed to the knuckle 400 with a nut 500. Note that a male thread is formed at the tip of the shaft portion 310.

A dust cover 100 is used in order to prevent entry of water, dust, etc. into a joint portion and prevent an outflow of grease from the joint portion.

<Dust Cover>

The overall configuration of the dust cover 100 will be described with reference particularly to FIG. 2. The dust cover 100 is constituted by a seal main body made of an elastic body such as rubber (e.g., chloroprene rubber) and an annular auxiliary seal 150 made of resin. It is possible to obtain the dust cover 100 by, e.g., after the auxiliary seal 150 made of resin is molded, applying an adhesive to the auxiliary seal 150, setting the auxiliary seal 150 in a mold, injecting a rubber material into the mold, and molding the seal main body by vulcanization. In addition, the auxiliary seal 150 according to the present embodiment is constituted by a solid lubricant in order to reduce sliding resistance. Further, the auxiliary seal 150 according to the present embodiment is constituted by a material excellent in low temperature resistance, and is constituted by a material that is at least higher in low temperature resistance than the rubber material of the seal main body. Specific examples of the material of the auxiliary seal 150 include PTFE, nylon, and polyamide each of which the low temperature resistance is increased by using a filler or the like.

The seal main body integrally has an annular film-like body portion 110 that is deformable, a fixed portion 130 that is provided on one end side of the body portion 110 and is fixed to the socket 200, and a seal portion 120 that is provided on the other end side of the body portion 110. An annular concave portion 131 is provided in the fixed portion 130. A clamp 600 is fitted in the annular concave portion 131, and the fixed portion 130 is thereby fixed to the case 210 of the socket 200. The auxiliary seal 150 is provided in the seal portion 120. In the thus configured dust cover 100, when the ball stud 300 swings with respect to the socket 200, the body portion 110 deforms (see FIG. 1). In addition, when the ball stud 300 rotates with respect to the socket 200, the seal portion 120 slides on the shaft portion 310 of the ball stud 300 and the knuckle 400. With this, even when the ball stud 300 swings or rotates with respect to the socket 200, a sealing function is exerted by the dust cover 100.

<Seal Portion and Auxiliary Seal>

The seal portion 120 and the auxiliary seal 150 according to the present embodiment will be described in greater detail with reference particularly to FIGS. 3 to 5. The seal portion 120 includes an inner peripheral seal portion (a first inner peripheral seal portion 121a and a second inner peripheral seal portion 121b) that is slidable on an outer peripheral surface of the shaft portion 310 of the ball stud 300, and a dust seal portion (a dust lip 122) that is slidable on an end surface of the knuckle 400. Each of the first inner peripheral seal portion 121a and the second inner peripheral seal portion 121b is constituted by an annular convex portion that protrudes radially inwardly. Note that two inner peripheral seal portions are provided in the present embodiment, but the number of the inner peripheral seal portions to be provided may also be one, or three or more. The dust lip 122 is constituted by an inclined part that is inclined radially outwardly toward the end surface of the knuckle 400.

The auxiliary seal 150 includes an auxiliary inner peripheral seal portion 151 that is slidable on the outer peripheral surface of the shaft portion 310 of the ball stud 300. The auxiliary inner peripheral seal portion 151 is constituted by an annular convex portion that protrudes radially inwardly. The amount of the radially inward protrusion of the auxiliary inner peripheral seal portion 151 is smaller than the amount of the radially inward protrusion of each of the first inner peripheral seal portion 121a and the second inner peripheral seal portion 121b (see FIG. 3). With this, the sealing function by the first inner peripheral seal portion 121a and the second inner peripheral seal portion 121b is not prevented. In addition, the auxiliary seal 150 includes an auxiliary dust seal portion (a first auxiliary dust seal portion 152a and a second auxiliary dust seal portion 152b) that is slidable on the end surface of the knuckle 400. The first auxiliary dust seal portion 152a is constituted by a lip that is inclined radially outwardly toward the end surface of the knuckle 400. The second auxiliary dust seal portion 152b is constituted by an annular convex portion that protrudes toward the end surface of the knuckle 400. The amount of the protrusion of the auxiliary dust seal portion toward the knuckle 400 is smaller than the amount of the protrusion of the dust lip 122 toward the knuckle 400 (see FIG. 3). With this, the sealing function by the dust lip 122 is not prevented.

Further, the auxiliary seal 150 includes a supported portion 153 that is supported by a collar 330 as a fixed member fixed to the shaft portion 310 of the ball stud 300 on an opposite side to the auxiliary dust seal portion in an axial direction. In the auxiliary seal 150, a plurality of slits 153a are formed on the opposite side to the auxiliary dust seal portion in the axial direction. A tip surface of a part that is not provided with the slit 153a serves as the supported portion 153. A part that is provided with the inner peripheral seal portion and a part that is provided with the dust seal portion in the seal portion 120 are connected to each other via the slits 153a.

Herein, as described above, the collar 330 is fixed to the shaft portion 310 of the ball stud 300. In a state in which the seal portion 120 of the dust cover 100 is mounted to the ball stud 300, the supported portion 153 in the auxiliary seal 150 comes into intimate contact with the collar 330 and the auxiliary seal 150 is supported by the collar 330 (see FIG. 4). Note that the collar 330 is constituted by a material having high rigidity such as metal or resin. In addition, the present embodiment has described the configuration in the case where the collar 330 as a member separate from the shaft portion 310 is fixed to the shaft portion 310, but it is also possible to adopt a configuration in which a portion corresponding to the collar 330 is provided integrally with the shaft portion 310.

In addition, in the seal portion 120, a part on the side of the inner peripheral surface of the auxiliary seal 150 is compressed by the inner peripheral surface of the auxiliary seal 150 and the outer peripheral surface of the shaft portion 310 of the ball stud 300. With this, the first inner peripheral seal portion 121a and the second inner peripheral seal portion 121b are pressed radially inwardly by the inner peripheral surface of the auxiliary seal 150.

<Advantages of the Dust Cover According to the Present Embodiment>

According to the dust cover 100 according to the present embodiment, since the auxiliary seal 150 made of resin is provided, even when the sealing function of the seal portion 120 in the seal main body made of an elastic body is not adequately exerted in a low temperature environment or the like, sealing performance is maintained by the auxiliary seal 150.

In addition, in the auxiliary seal 150, the inner peripheral surface side and both end sides in the axial direction are supported. That is, on the inner peripheral surface side of the auxiliary seal 150, the auxiliary inner peripheral seal portion 151 is slidably in contact with the shaft portion 310 in the ball stud 300, and hence the inner peripheral surface side of the auxiliary seal 150 is supported by the shaft portion 310. Further, on one end side in the axial direction in the auxiliary seal 150, the auxiliary dust seal portion (the first auxiliary dust seal portion 152a and the second auxiliary dust seal portion 152b) is slidably in contact with the end surface of the knuckle 400 fixed to the shaft portion 310, and hence one end side of the auxiliary seal 150 is supported by the knuckle 400. Furthermore, on the other end side in the axial direction in the auxiliary seal 150, the supported portion 153 is supported by the collar 330 fixed to the shaft portion 310. Consequently, the attitude of the auxiliary seal 150 with respect to the ball stud 300 and the knuckle 400 is stably maintained irrespective of the attitude of the ball stud 300 with respect to the socket 200. With this, the sealing performance by the auxiliary seal 150 is stably exerted irrespective of the attitude of the ball stud 300 with respect to the socket 200.

In addition, the attitude of the auxiliary seal 150 with respect to the ball stud 300 and the knuckle 400 is stably maintained, whereby the attitude of the seal portion 120 in the seal main body with respect to the ball stud 300 and the knuckle 400 is also stably maintained. With this, the sealing performance by the seal portion 120 is also stably exerted irrespective of the attitude of the ball stud 300 with respect to the socket 200.

In the present embodiment, by providing the auxiliary seal 150, the attitude of the seal portion 120 is stably maintained, and hence it is not necessary to increase the pressing force of the inner peripheral seal portion in the seal portion 120 to the shaft portion 310. With this, an increase in the sliding resistance of the inner peripheral seal portion to the shaft portion 310 is avoided. Further, in the present embodiment, since the auxiliary seal 150 is constituted by the solid lubricant, it is possible to further reduce the sliding resistance.

In addition, the part that is provided with the inner peripheral seal portion and the part that is provided with the dust seal portion in the seal portion 120 are connected to each other via the plurality of slits 153a formed in the auxiliary seal 150. With this, it is possible to provide the auxiliary seal 150 made of resin that includes the auxiliary inner peripheral seal portion and the auxiliary dust seal portion in the seal portion 120 made of an elastic body that includes the inner peripheral seal portion and the dust seal portion.

Further, in the present embodiment, the resin material used for the auxiliary seal 150 is higher in low temperature resistance than the rubber material used for the seal main body. With this, even when the sealing performance of the seal portion 120 in the seal main body is reduced in the low temperature environment, the sealing performance of the auxiliary seal 150 is maintained.

(Others)

The embodiment described above has described the case where the dust lip 122 and the auxiliary dust seal portion (the first auxiliary dust seal portion 152a and the second auxiliary dust seal portion 152b) slide on the knuckle 400. However, the present disclosure includes the case where the dust lip and the auxiliary dust seal portion slide on another member provided on the end surface side of the knuckle. For example, as in a technique disclosed in Japanese Patent Application Laid-open No. H11-63245, in a configuration in which a ferrule that abuts on the knuckle is provided, the present disclosure can also be applied to the case where the dust lip and the auxiliary dust seal portion slide on the ferrule.

In addition, the embodiment described above has described the case where the inner peripheral seal portion (the first inner peripheral seal portion 121a and the second inner peripheral seal portion 121b) and the auxiliary inner peripheral seal portion 151 slide on the outer peripheral surface of the shaft portion 310 of the ball stud 300. However, the present disclosure can also be applied to the case where the inner peripheral seal portion and the auxiliary inner peripheral seal portion are configured so as to be slidable on the outer peripheral surface of another member provided on the outer peripheral surface side of the shaft portion 310 of the ball stud 300. For example, as in the technique disclosed in Japanese Patent Application Laid-open No. H11-63245 mentioned above, in the configuration in which the ferrule is provided, the present disclosure can also be applied to the case where the inner peripheral seal portion and the auxiliary inner peripheral seal portion slide on the ferrule. In addition, as in a technique disclosed in Japanese Utility Model Application Laid-open No. H3-32211, in a configuration in which a retaining member (retainer) having a flange is provided, the present disclosure can also be applied to the case where the inner peripheral seal portion and the auxiliary inner peripheral seal portion slide on the retainer.

Further, the present embodiment has described the configuration in the case where the supported portion 153 in the auxiliary seal 150 is supported by the collar 330 fixed to the shaft portion 310 of the ball stud 300. However, in the present disclosure, the member that supports the supported portion 153 is not limited to the collar 330. For example, as in the technique disclosed in Japanese Utility Model Application Laid-open No. H3-32211 mentioned above, in the configuration in which the retainer is provided, the present disclosure can also be applied to the case where the supported portion is supported by the flange in the retainer. In addition, as in the technique disclosed in Japanese Patent Application Laid-open No. H11-63245 mentioned above, in the configuration in which the ferrule is provided, the present disclosure can also be applied to the case where a flange is provided in the ferrule and the supported portion is supported by the flange.

Embodiment 2

Figure 6:
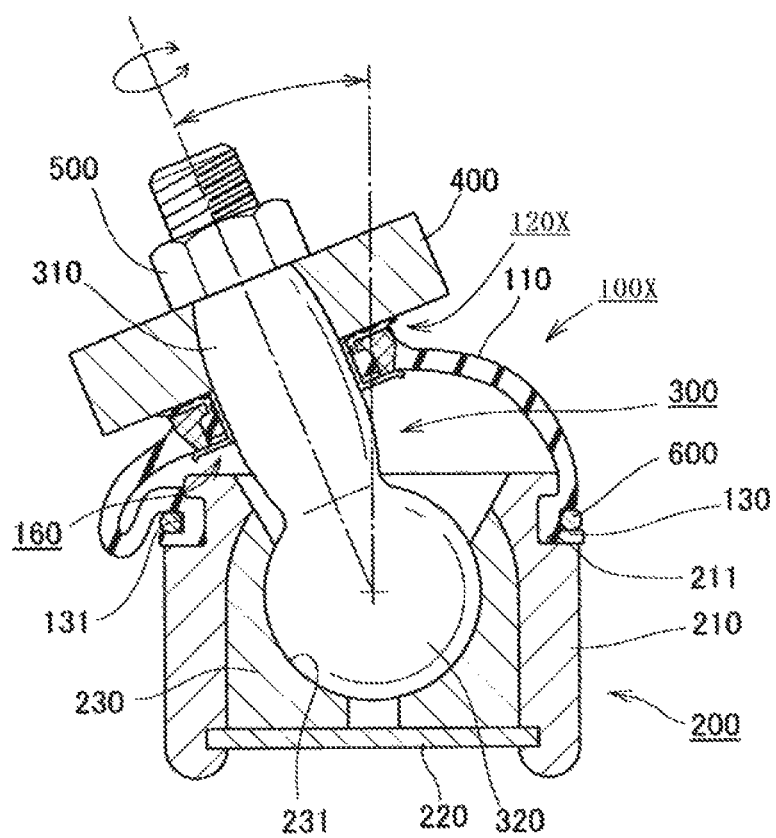
FIG. 6 is a schematic cross-sectional view of a ball joint and a dust cover mounted to the ball joint according to Embodiment 2 of the present disclosure.
Figure 7:
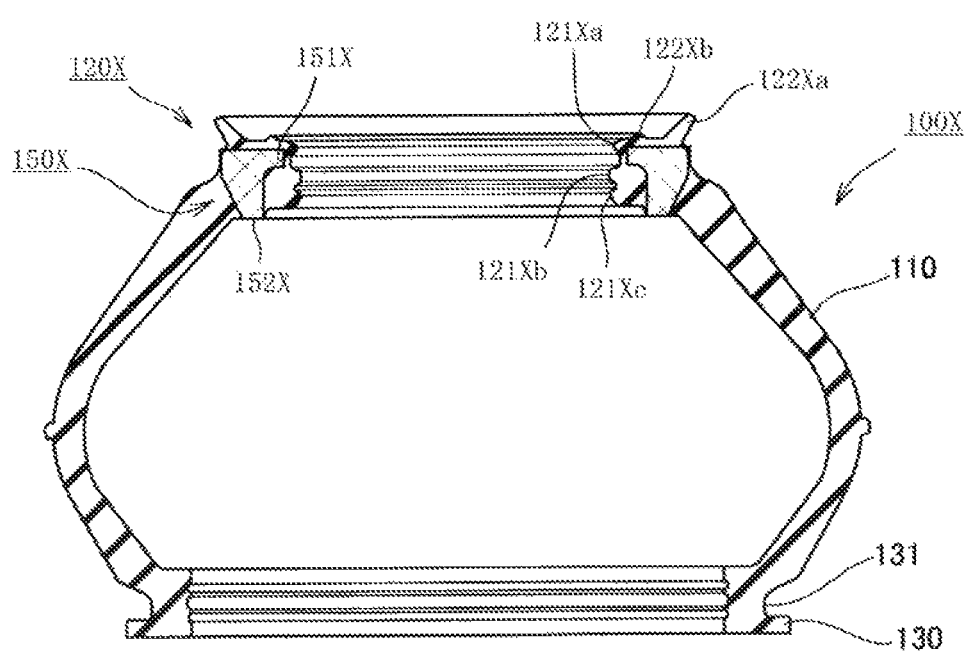
FIG. 7 is a schematic cross-sectional view of the dust cover according to Embodiment 2 of the present disclosure.
Figure 8:
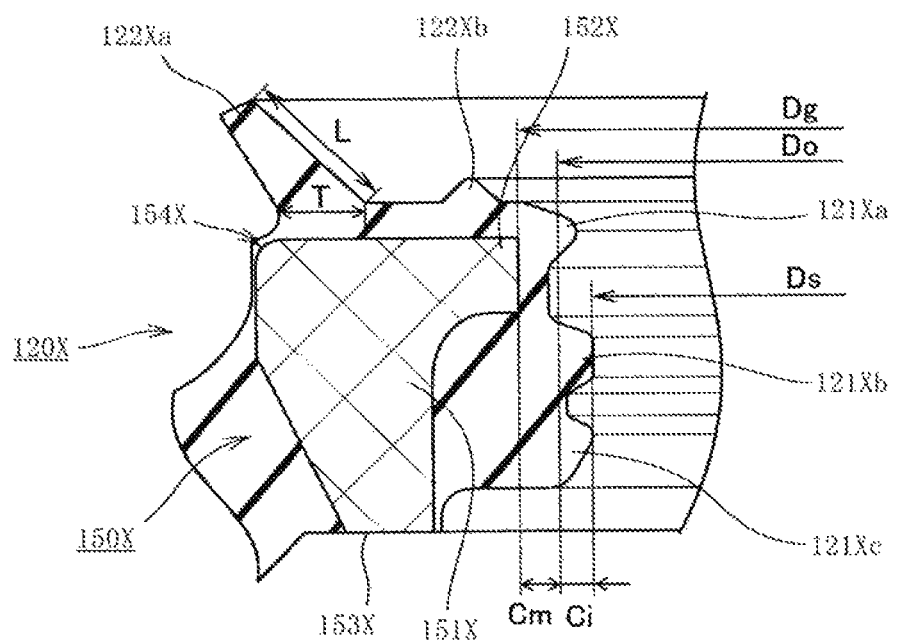
FIG. 8 is a schematic cross-sectional view in which a part in the vicinity of a seal portion in the dust cover according to Embodiment 2 of the present disclosure is enlarged.
Figure 9:
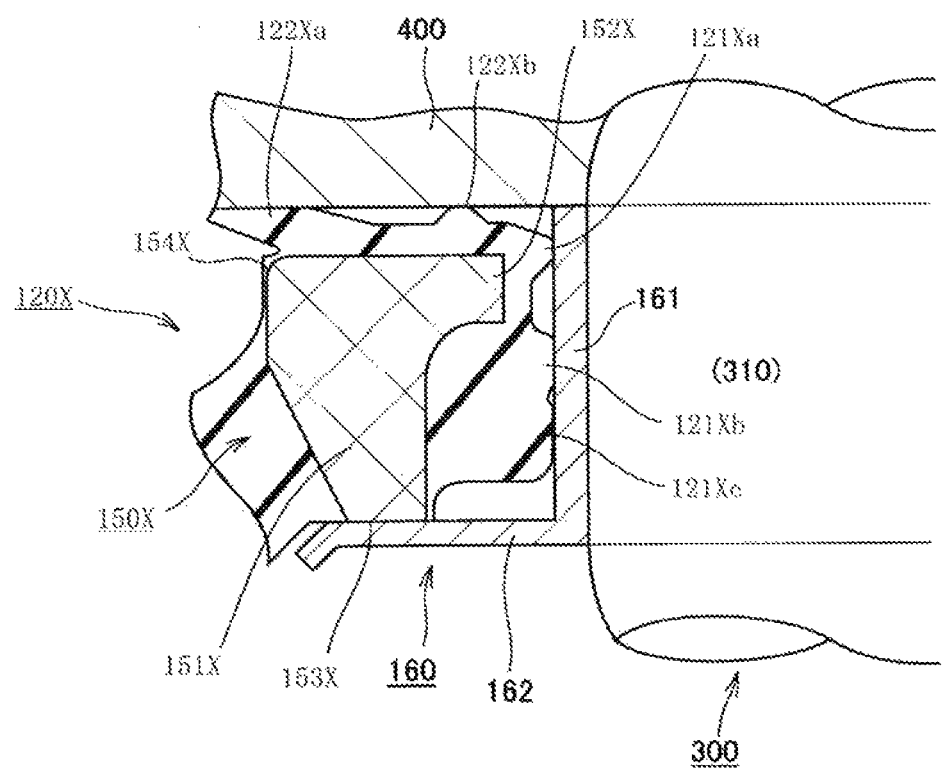
FIG. 9 is a schematic cross-sectional view in which the part in the vicinity of the seal portion in the dust cover is enlarged in a state in which the dust cover according to Embodiment 2 of the present disclosure is mounted to the ball joint.
Figure 10:
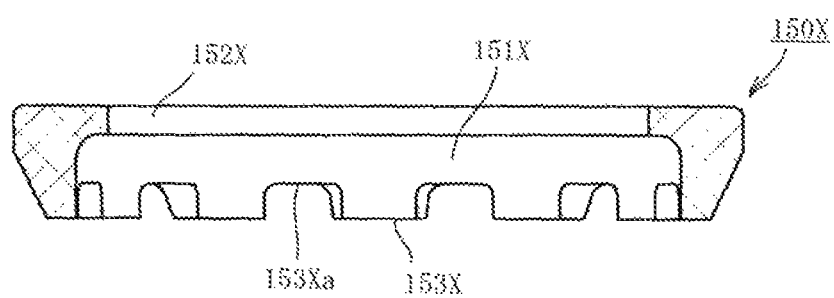
FIG. 10 is a schematic cross-sectional view of a reinforcing ring according to Embodiment 2 of the present disclosure.

With reference to FIGS. 6 to 10, a dust cover according to Embodiment 2 of the present disclosure will be described. FIG. 6 is a schematic cross-sectional view of a ball joint and the dust cover mounted to the ball joint according to Embodiment 2 of the present disclosure. Note that FIG. 6 shows the cross-sectional view obtained by cutting using a plane that includes the central axis of a shaft portion of a ball stud provided in the ball joint. FIG. 7 is a schematic cross-sectional view of the dust cover according to Embodiment 2 of the present disclosure. Note that FIG. 7 shows the cross-sectional view obtained by cutting using a plane that includes the central axis of the annular dust cover in a state in which the dust cover is not deformed. FIG. 8 is a partially enlarged view of FIG. 7, and is a schematic cross-sectional view in which a part in the vicinity of a seal portion in the dust cover according to Embodiment 2 of the present disclosure is enlarged. FIG. 9 is a partially enlarged view of FIG. 6, and is a schematic cross-sectional view in which the part in the vicinity of the seal portion in the dust cover is enlarged in a state in which the dust cover according to Embodiment 2 of the present disclosure is mounted to the ball joint. FIG. 10 is a schematic cross-sectional view of a reinforcing ring according to Embodiment 2 of the present disclosure. Note that FIG. 10 shows the cross-sectional view obtained by cutting using a plane that includes the central axis in the reinforcing ring.

<Ball Joint>

An example of the ball joint to which the dust cover according to the present embodiment can be applied will be described with reference particularly to FIG. 6. The ball joint includes the ball stud 300 that has the spherical portion 320 at one end of the shaft portion 310, the socket 200 that rotatably and swingably supports the ball stud 300, and the knuckle 400 as the annular member that is fixed to the opposite side of the shaft portion 310 to the spherical portion 320. Note that the knuckle 400 corresponds to the coupling member that couples to the shaft portion 310 on the opposite side of the shaft portion 310 to the spherical portion 320. The socket 200 includes the annular case 210, the bottom plate 220 that is fixed to the bottom side of the case 210, and the bearing 230 of the spherical portion 320. The bearing 230 has the bearing surface 231 that is constituted by the spherical surface having the same radius as the curvature radius of the spherical portion 320. The knuckle 400 is provided in the vehicle body or the like, and the shaft portion 310 of the ball stud 300 is fixed to the knuckle 400 with the nut 500. Note that the male thread is formed at the tip of the shaft portion 310.

A dust cover 100X is used in order to prevent the entry of water, dust, etc. into the joint portion and prevent the outflow of grease from the joint portion. In addition, in the present embodiment, a retainer 160 that is constituted by a material having high rigidity such as metal or resin is fixed to a part of the shaft portion 310 to which a seal portion 120X of the dust cover 100X is mounted. The retainer 160 includes a cylindrical portion 161 that is fitted on the shaft portion 310 and an outward flange portion 162 that is provided on one end side of the cylindrical portion 161 (see FIG. 9).

<Dust Cover>

The overall configuration of the dust cover 100X will be described with reference particularly to FIG. 7. The dust cover 100X is constituted by a seal main body made of an elastic material such as rubber (e.g., chloroprene rubber) and a reinforcing ring 150X made of resin such as PTFE, nylon, or polyamide. In the present embodiment, it is possible to obtain the dust cover 100X by, after the reinforcing ring 150X made of resin is molded, applying an adhesive to the reinforcing ring 150X, setting the reinforcing ring 150X in a mold, injecting a rubber material into the mold, and molding the seal main body by vulcanization.

The seal main body integrally has the annular film-like body portion 110 that is deformable, the fixed portion 130 that is provided on one end side of the body portion 110 and is fixed to the socket 200, and the seal portion 120X that is provided on the other end side of the body portion 110. The annular concave portion 131 is provided in the fixed portion 130. The clamp 600 is fitted in the annular concave portion 131, and the fixed portion 130 is thereby fixed to the case 210 of the socket 200. The reinforcing ring 150X is provided in the seal portion 120X. In the thus configured dust cover 100X, when the ball stud 300 swings with respect to the socket 200, the body portion 110 deforms (see FIG. 6). In addition, when the ball stud 300 rotates with respect to the socket 200, the seal portion 120X slides on the shaft portion 310 of the ball stud 300 and the knuckle 400. With this, even when the ball stud 300 swings or rotates with respect to the socket 200, the sealing function is exerted by the dust cover 100X. Note that, in the present embodiment, the retainer 160 is fixed to the shaft portion 310, and hence the seal portion 120X slides on the cylindrical portion 161 of the retainer 160 instead of sliding directly on the shaft portion 310.

<Seal Portion and Reinforcing Ring>

The seal portion 120X and the reinforcing ring 150X according to the present embodiment will be described in greater detail with reference particularly to FIGS. 8 to 10. The seal portion 120X includes an inner peripheral seal portion that is slidable on an outer peripheral surface of the cylindrical portion 161 of the retainer 160 fixed to the shaft portion 310 of the ball stud 300, and a dust seal portion that is slidable on the end surface of the knuckle 400.

The inner peripheral seal portion according to the present embodiment includes a first inner peripheral convex portion 121Xa, a second inner peripheral convex portion 121Xb, and a third inner peripheral convex portion 121Xc arranged in this order from the other end side to one end side. Each of the first inner peripheral convex portion 121Xa, the second inner peripheral convex portion 121Xb, and the third inner peripheral convex portion 121Xc is constituted by an annular convex portion that protrudes radially inwardly. Herein, the first inner peripheral convex portion 121Xa exerts the function of preventing tilting of the seal portion 120X when a pulling force is applied to the seal portion 120X from the body portion 110 due to tilting of the ball stud 300. Note that three inner peripheral convex portions are provided in the present embodiment, but the number of the inner peripheral convex portions to be provided may also be only two, or four or more. The inner diameter of the radially inward foremost end portion of the first inner peripheral convex portion 121Xa is designed so as to be larger than the inner diameter of the radially inward foremost end portion of the second inner peripheral convex portion 121Xb. Note that the inner diameter of the radially inward foremost end portion of the second inner peripheral convex portion 121Xb and the inner diameter of the radially inward foremost end portion of the third inner peripheral convex portion 121Xc are designed so as to be equal to each other.

The dust seal portion according to the present embodiment includes a dust lip 122Xa that is provided radially outwardly, and an annular convex portion 122Xb that is provided radially inwardly. The dust lip 122Xa is configured so as to extend radially outwardly toward the surface side of the knuckle 400. Herein, T represents the width of the base of the dust lip 122Xa, and L represents the length thereof, the dust lip 122Xa is designed so as to satisfy $0.45 \leq T \div L \leq 0.6$. Note that the width T of the base is defined by using the radial width of the base part of the dust lip 122Xa. In addition, the length L is defined by using a distance from the radially inward position of the base of the dust lip 122Xa to the foremost end position of the dust lip 122Xa.

The reinforcing ring 150X includes a tubular portion 151X and an inward flange portion 152X that is provided on the other end side of the tubular portion 151X. The inner peripheral surface of the tubular portion 151X is constituted by a cylindrical surface. In addition, one end side of the tubular portion 151X serves as a supported portion 153X that is supported by the outward flange portion 162 of the retainer 160 serving as a fixed member fixed to the shaft portion 310 of the ball stud 300. Further, a plurality of slits 153Xa are formed on one end side of the tubular portion 151X in the reinforcing ring 150X. The tip surface of a part that is not provided with the slit 153Xa serves as the supported portion 153X. A part that is provided with the inner peripheral seal portion in the seal portion 120X and a part that is provided with the body portion 110 are connected to each other via the slits 153Xa. The reinforcing ring 150X is buried in the seal portion 120X, only the supported portion 153X (the end surface of the tubular portion 151X on one end side) is exposed, and the other part is buried in the seal portion 120X. Note that an outer peripheral end edge of a part that connects the tubular portion 151X and the inward flange portion 152X is constituted by a small chamfer portion (R surface) 154X such that the deformation of the dust lip 122Xa is facilitated.

Herein, as described above, the retainer 160 is fixed to the shaft portion 310 of the ball stud 300. In a state in which the seal portion 120X of the dust cover 100X is mounted to the ball stud 300, the supported portion 153X in the reinforcing ring 150X comes into intimate contact with the outward flange portion 162 of the retainer 160, and the reinforcing ring 150X is supported by the outward flange portion 162 (see FIG. 9).

The present embodiment has described the configuration in the case where the retainer 160 is fixed to the shaft portion 310, and it is also possible to adopt a configuration in which a collar (a member obtained by forming a hole in the center of a disk-like member) is fixed to the shaft portion 310. In this case, the supported portion 153X in the reinforcing ring 150X comes into intimate contact with the collar, and the reinforcing ring 150X is supported by the collar. In addition, the inner peripheral seal portion (the first inner peripheral convex portion 121Xa, the second inner peripheral convex portion 121Xb, and the third inner peripheral convex portion 121Xc) slides directly on the shaft portion 310 of the ball stud 300. Further, it is also possible to adopt a configuration in which a portion corresponding to the outward flange portion 162 or the collar is provided integrally with the shaft portion 310 instead of fixing the retainer 160 or the collar as a member separate from the shaft portion 310 to the shaft portion 310. In this case, the supported portion 153X in the reinforcing ring 150X comes into intimate contact with the portion corresponding to the outward flange portion 162 or the collar, and the reinforcing ring 150X is supported by the portion. The inner peripheral seal portion slides directly on the shaft portion 310 of the ball stud 300.

In the seal portion 120X, a part on the side of the inner peripheral surface of the reinforcing ring 150X is compressed by the inner peripheral surface of the reinforcing ring 150X and the outer peripheral surface of the cylindrical portion 161 of the retainer 160. With this, the first inner peripheral convex portion 121Xa, the second inner peripheral convex portion 121Xb, and the third inner peripheral convex portion 121Xc are pressed radially inwardly by the inner peripheral surface of the reinforcing ring 150X.

In the present embodiment, the tip of the inward flange portion 152X in the reinforcing ring 150X is provided so as to be positioned between the radially inward foremost end portion of the first inner peripheral convex portion 121Xa and the radially inward foremost end portion of the second inner peripheral convex portion 121Xb in the seal portion 120X in the axial direction. In addition, the radial dimensions of the seal portion 120X and the reinforcing ring 150X are set in the following manner. That is, as shown in FIG. 8, Do represents the outer diameter of a part of the shaft portion 310 on which the second inner peripheral convex portion 121Xb slides. Note that, in the present embodiment, the second inner peripheral convex portion 121Xb slides on the cylindrical portion 161 of the retainer 160 instead of sliding directly on the shaft portion 310, and hence the outer diameter Do corresponds to the outer diameter of the cylindrical portion 161. In addition, Dg represents the inner diameter of the tip of the inward flange portion 152X of the reinforcing ring 150X. Further, Ds represents the inner diameter of the radially inward foremost end portion of the second inner peripheral convex portion 121Xb. At this point, in the present embodiment, they are designed so as to satisfy Ci (=(Do−Ds)÷2)<Cm (=(Dg−Do)÷2). Note that Ci corresponds to the interference of the second inner peripheral convex portion 121Xb, and Cm corresponds to a gap between the reinforcing ring 150X and the cylindrical portion 161 of the retainer 160.

<Advantages of the Dust Cover According to the Present Embodiment≤

According to the dust cover 100X according to the present embodiment, in the reinforcing ring 150X provided in the seal portion 120X, the supported portion 153X that is supported by the outward flange portion 162 of the retainer 160 fixed to the shaft portion 310 is provided. Consequently, it is possible to stably maintain the attitude of the seal portion 120X with respect to the ball stud 300 and the knuckle 400 irrespective of the attitude of the ball stud 300 with respect to the socket 200. With this, the sealing performance by the seal portion 120X is stably exerted irrespective of the attitude of the ball stud 300 with respect to the socket 200.

In addition, the tip of the inward flange portion 152X in the reinforcing ring 150X is provided so as to be positioned between the radially inward foremost end portion of the first inner peripheral convex portion 121Xa and the radially inward foremost end portion of the second inner peripheral convex portion 121Xb in the seal portion 120X in the axial direction. With this, it is possible to prevent the pressing force to the shaft portion 310 (the cylindrical portion 161 of the retainer 160) by the first inner peripheral convex portion 121Xa and the second inner peripheral convex portion 121Xb from becoming excessively large. Consequently, it is possible to prevent the sliding resistance between the first and second inner peripheral convex portions 121Xa and 121Xb and the shaft portion 310 (the cylindrical portion 161 of the retainer 160) from becoming excessively large while exerting the sealing performance by the first inner peripheral convex portion 121Xa and the second inner peripheral convex portion 121Xb.

In addition, as described above, the dust cover 100X according to the present embodiment is designed so as to satisfy Ci<Cm. That is, the dust cover 100X is designed such that the gap between the reinforcing ring 150X and the cylindrical portion 161 of the retainer 160 is larger than the interference of the second inner peripheral convex portion 121Xb.

With this, it becomes possible to increase the thickness of a part of the seal main body that covers the tip of the inward flange portion 152X to a certain degree while preventing the sliding resistance by the second inner peripheral convex portion 121Xb from becoming excessively large. With this, it is possible to prevent a reduction in moldability when the seal main body is molded. That is, in general, in the case where injection molding is performed by using a rubber material, when a thin part is present, the fluidity of the rubber material when the rubber material injected into a mold passes through the thin part is poor, and molding failure tends to occur. In addition, when Ci>Cm is set after the value of Cm is set to such a degree that the occurrence of the molding failure is prevented, the interference of the second inner peripheral convex portion 121Xb becomes excessively large, and the sliding resistance is increased. When the sliding resistance becomes excessively large, the body portion 110 deforms abnormally and may be damaged due to occurrence of buckling or the like. To cope with this, in the present embodiment, by designing the dust cover 100X such that Ci<Cm is satisfied, the sliding resistance by the second inner peripheral convex portion 121Xb is prevented from becoming excessively large while the molding failure is prevented.

Further, in the present embodiment, T represents the width of the base of the dust lip 122Xa, L represents the length thereof, and the dust lip 122Xa is designed so as to satisfy $0.45 \leq T \div L \leq 0.6$. With this, it is possible to stabilize the sealing performance by the dust lip 122Xa for a long time period. That is, it is known that, in general, in the case of rubber, when deformed rubber is continuously heated, the resilience of the rubber is lost and the rubber is permanently deformed. A permanent deformation amount of the rubber is increased as an initial deformation amount of the rubber (in the case of the present embodiment, the initial deformation amount corresponds to an initial compression amount of the dust lip 122Xa) is increased. In the case where $T \div L$ is set to be smaller than 0.45, the initial compression amount of the dust lip 122Xa is small, and the initial sealing performance becomes insufficient. In the case where $T \div L$ is set to be larger than 0.6, the permanent deformation amount in the case where the rubber is continuously heated is increased, and a reduction amount of the sealing performance is increased. To cope with this, the dust lip 122Xa according to the present embodiment is designed so as to satisfy $0.45 \leq T \div L \leq 0.6$. With this, it is possible to maintain the stable sealing performance even when the permanent deformation occurs while adequately satisfying the initial sealing performance.

Embodiment 3

Figure 11:
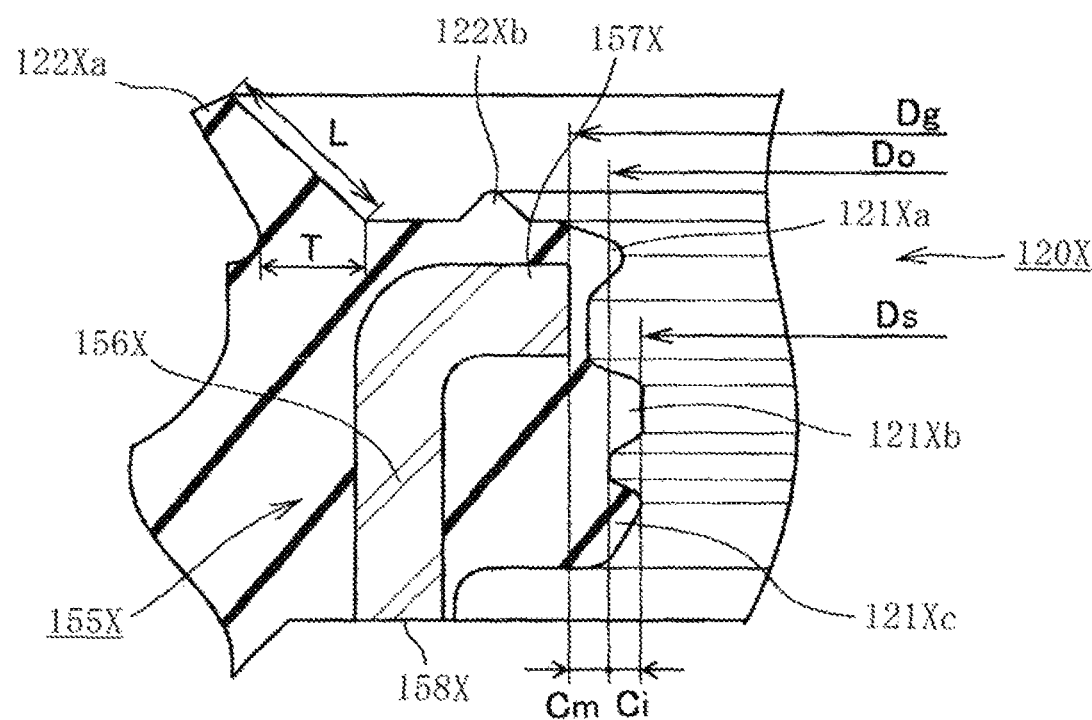
FIG. 11 is a schematic cross-sectional view in which a part in the vicinity of a seal portion in a dust cover according to Embodiment 3 of the present disclosure is enlarged.
Figure 12:
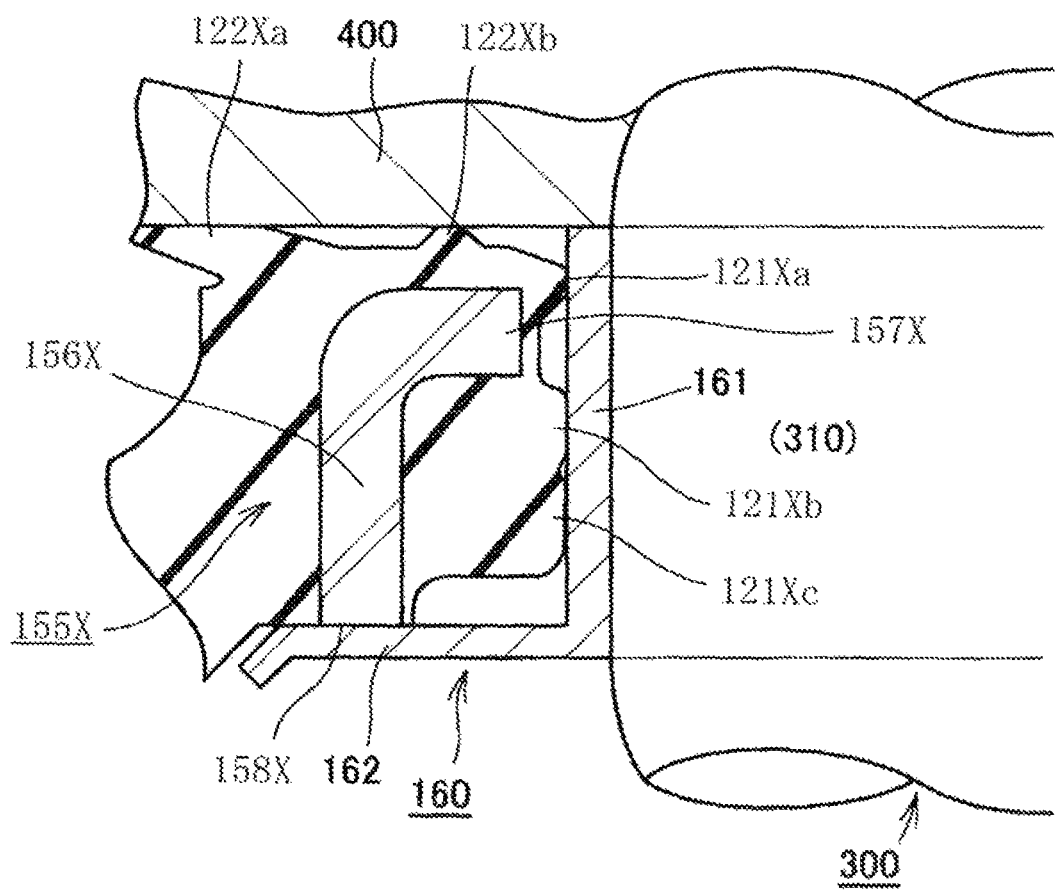
FIG. 12 is a schematic cross-sectional view in which the part in the vicinity of the seal portion in the dust cover is enlarged in a state in which the dust cover according to Embodiment 3 of the present disclosure is mounted to a ball joint.
Figure 13:
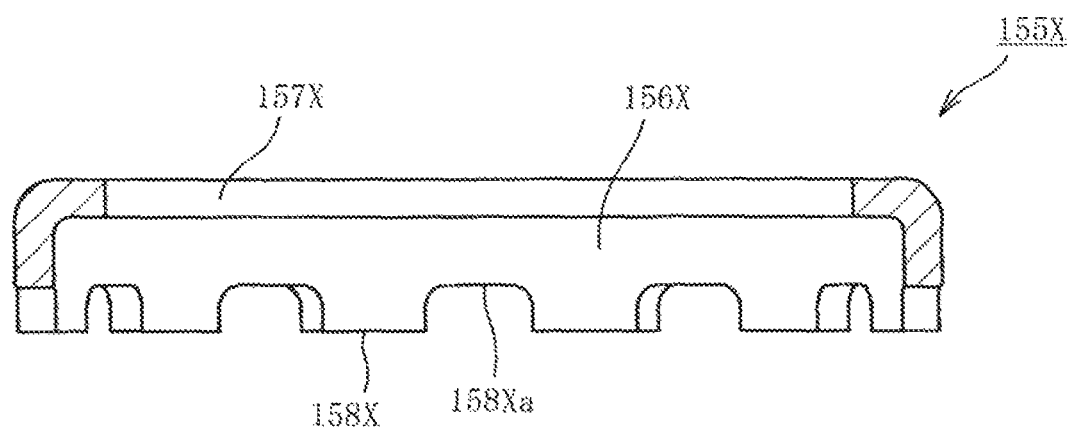
FIG. 13 is a schematic cross-sectional view of a reinforcing ring according to Embodiment 3 of the present disclosure.
Figure 14:
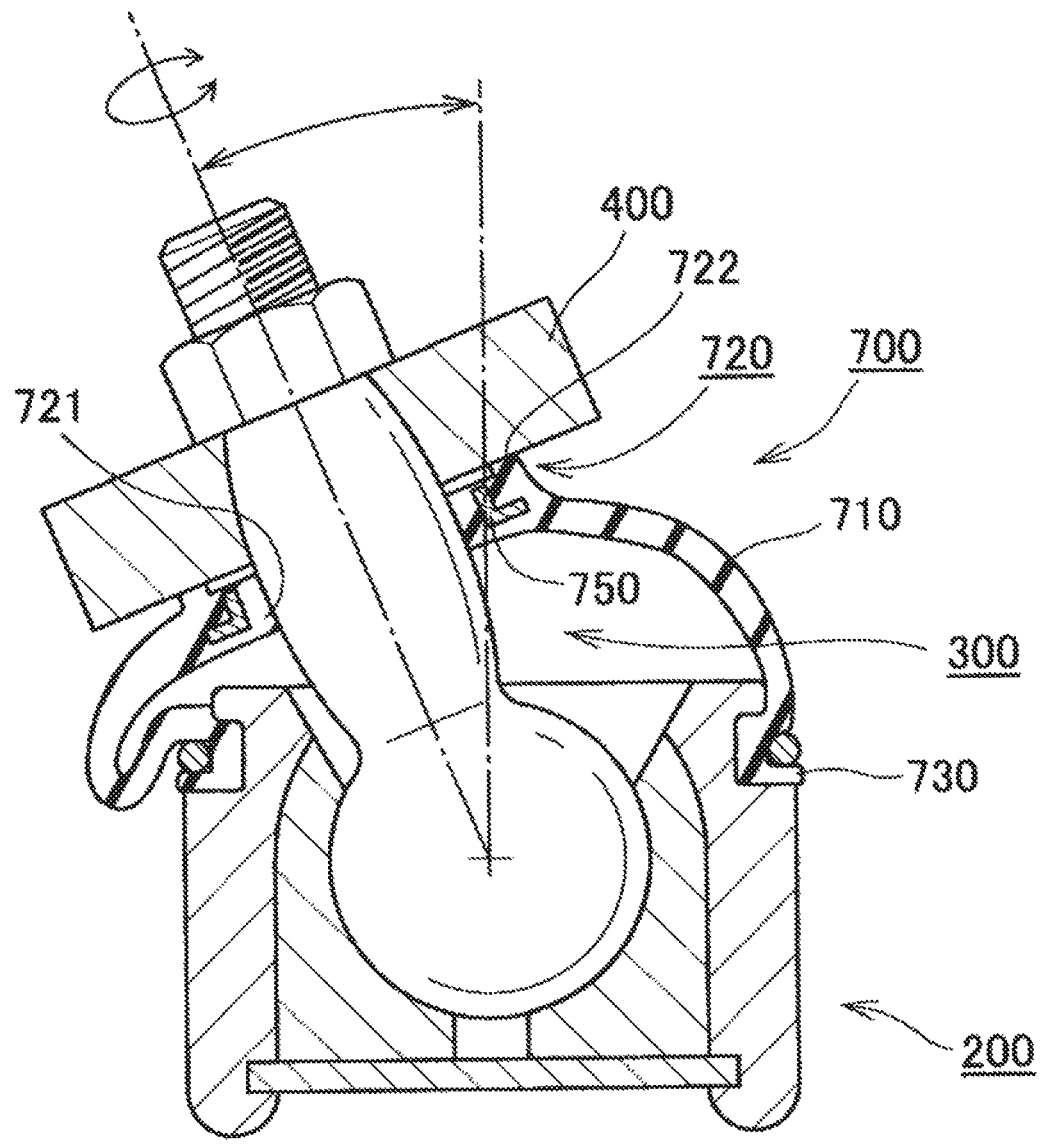
FIG. 14 is a schematic cross-sectional view of a ball joint and a dust cover mounted to the ball joint according to a prior art.

FIGS. 11 to 13 show Embodiment 3 of the present disclosure. Embodiment 2 described above has described the configuration in the case where the reinforcing ring is made of resin, and the present embodiment describes a configuration in the case where the reinforcing ring is made of metal. The configurations and operations other than the reinforcing ring are the same as those in Embodiment 2, and hence the same components as those in Embodiment 2 are designated by the same reference numerals as those in Embodiment 2 and the description thereof will be omitted.

The configuration of the ball joint and the overall configuration of the dust cover are as described in Embodiment 2 described above, and hence the description thereof will be omitted. Hereinbelow, with reference to FIGS. 11 to 13, the seal portion 120X and a reinforcing ring 155X according to the present embodiment will be described. FIG. 11 is a schematic cross-sectional view in which a part in the vicinity of a seal portion in a dust cover according to Embodiment 3 of the present disclosure is enlarged. FIG. 12 is a schematic cross-sectional view in which the part in the vicinity of the seal portion in the dust cover is enlarged in a state in which the dust cover according to Embodiment 3 of the present disclosure is mounted to a ball joint. FIG. 13 is a schematic cross-sectional view of a reinforcing ring according to Embodiment 3 of the present disclosure. Note that FIG. 13 shows the cross-sectional view obtained by cutting using a plane that includes the central axis in the reinforcing ring.

The configuration of the seal portion 120X is the same as that in Embodiment 2, and hence the description thereof will be appropriately omitted, and the reinforcing ring 155X will be described in detail. Similarly to the case of Embodiment 2, the reinforcing ring 155X according to the present embodiment also includes a tubular portion 156X and an inward flange portion 157X that is provided on the other end side of the tubular portion 156X. The strength of the tubular portion 151X is increased by increasing the thickness of the other end side in the case of Embodiment 2. In the case of the present embodiment, the reinforcing ring 155X is made of metal and the strength thereof is high, and hence the tubular portion 156X is constituted by a cylindrical portion having a relatively small thickness. Similarly to the case of Embodiment 2 described above, one end side of the tubular portion 156X serves as a supported portion 158X that is supported by the outward flange portion 162 of the retainer 160. Similarly to the case of Embodiment 2 described above, a plurality of slits 158Xa are formed on one end side of the tubular portion 156X in the reinforcing ring 155X. In addition, similarly to the case of Embodiment 2 described above, the tip surface of a part that is not provided with the slit 158Xa serves as the supported portion 158X. Further, similarly to the case of Embodiment 2, the reinforcing ring 155X is buried in the seal portion 120X, only the supported portion 158X is exposed, and the other part is buried in the seal portion 120X.

In addition, the collar may be used instead of the retainer 160, and the configuration in which the part corresponding to the outward flange portion 162 or the collar is provided integrally with the shaft portion 310 may be adopted, as described in Embodiment 2 described above. Further, similarly to the case of Embodiment 2 described above, the tip of the inward flange portion 157X in the reinforcing ring 155X is provided so as to be positioned between the radially inward foremost end portion of the first inner peripheral convex portion 121Xa and the radially inward foremost end portion of the second inner peripheral convex portion 121Xb in the seal portion 120X in the axial direction. Furthermore, as described in Embodiment 2 described above, the radial dimensions of the seal portion 120X and the reinforcing ring 155X are designed so as to satisfy Ci ($=(Do-Ds) \div 2$)<Cm ($=(Dg-Do) \div 2$).

It will be easily understood that effects similar to those of the case of Embodiment 2 described above are obtained also in the thus configured dust cover according to the present embodiment.

(Others)

Each of Embodiments 2 and 3 described above has described the case where the dust seal portion (the dust lip 122Xa and the annular convex portion 122Xb) slides on the knuckle 400. However, the present disclosure includes the case where the dust seal portion slides on another member that is provided on the end surface side of the knuckle. For example, as in the technique disclosed in Japanese Patent Application Laid-open No. H11-63245, in the configuration in which the ferrule that abuts on the knuckle is provided, the present disclosure can also be applied to the case where the dust seal portion slides on the ferrule.

REFERENCE SIGNS LIST 100, 100X: Dust cover
110: Body portion
120, 120X: Seal portion
121a: First inner peripheral seal portion
121b: Second inner peripheral seal portion
121Xa: First inner peripheral convex portion
121Xb: Second inner peripheral convex portion 121Xc: Third inner peripheral convex portion
122: Dust lip
122Xa: Dust lip
122Xb: Annular convex portion
130: Fixed portion
131: Annular concave portion
150: Auxiliary seal
150X, 155X: Reinforcing ring
151: Auxiliary inner peripheral seal portion
151X, 156X: Tubular portion
152a: First auxiliary dust seal portion
152b: Second auxiliary dust seal portion
152X, 157X: Inward flange portion
153, 153X, 158X: Supported portion
153a, 153Xa, 158Xa: Slit
160: Retainer
161: Cylindrical portion
162: Outward flange portion
200: Socket
210: Case
220: Bottom plate
230: Bearing
231: Bearing surface
300: Ball stud
310: Shaft portion
320: Spherical portion
330: Collar
400: Knuckle
500: Nut
600: Clamp

The invention claimed is:

1. A dust cover used in a ball joint including:
a ball stud that has a spherical portion at one end of a shaft portion;
a socket that has a bearing which receives the spherical portion and rotatably and swingably supports the ball stud; and
a coupling member that couples to the shaft portion on an opposite end of the shaft portion to the spherical portion,
the dust cover comprising:
a seal main body made of an elastic body and integrally having:
a deformable body portion;
a fixed portion that is provided on one end side of the body portion and is fixed to the socket; and
a seal portion that is provided on another end side of the body portion and is provided so as to be slidable on the shaft portion and the coupling member; and
an annular auxiliary seal made of resin or metal and provided in the seal portion, wherein the seal portion includes:
an inner peripheral seal portion that is slidable on an outer peripheral surface of the shaft portion; and
a dust seal portion that is slidable on an end surface of the coupling member, and the auxiliary seal includes:
an auxiliary inner peripheral seal portion that is slidable on the outer peripheral surface of the shaft portion;
an auxiliary dust seal portion that is slidable on the end surface of the coupling member; and
a supported portion that is supported by a fixed member fixed to the shaft portion on an opposite side to the auxiliary dust seal portion in an axial direction.

2. The dust cover according to claim 1, wherein a plurality of slits are formed on the opposite side of the auxiliary seal to the auxiliary dust seal portion in the axial direction, and a part that is provided with the inner peripheral seal portion and a part that is provided with the dust seal portion in the seal portion are connected to each other via the slits.

3. The dust cover according to claim 1, wherein a resin material used for the auxiliary seal is higher in low temperature resistance than a rubber material used for the seal main body.

4. The dust cover according to claim 2, wherein a resin material used for the auxiliary seal is higher in low temperature resistance than a rubber material used for the seal main body.

5. The dust cover according to claim 1, wherein the dust seal portion has a dust lip that extends radially outwardly toward a surface side of the coupling member, and the dust lip satisfies $0.45 < T \div L < 0.6$, where T represents a width of a base of the dust lip, and L represents a length of the dust lip.

6. A dust cover used in a ball joint including:
a ball stud that has a spherical portion at one end of a shaft portion;
a socket that has a bearing which receives the spherical portion and rotatably and swingably supports the ball stud; and
a coupling member that couples to the shaft portion on an opposite end of the shaft portion to the spherical portion, the dust cover comprising:
a seal main body made of an elastic body and integrally having:
a deformable body portion;
a fixed portion that is provided on one end side of the body portion and is fixed to the socket, and
a seal portion that is provided on another end side of the body portion and is provided so as to be slidable on the shaft portion and the coupling member; and
a reinforcing ring made of resin or metal and provided in the seal portion, wherein the seal portion includes:
an inner peripheral seal portion that is slidable on an outer peripheral surface of the shaft portion; and
a dust seal portion that is slidable on an end surface of the coupling member, wherein the inner peripheral seal portion has:
a first inner peripheral convex portion that is slidable on the outer peripheral surface of the shaft portion; and
a second inner peripheral convex portion that is provided adjacent to the first inner peripheral convex portion and closer to the one end side than the first inner peripheral convex portion, and is slidable on the outer peripheral surface of the shaft portion, the reinforcing ring includes:
a supported portion that is supported by a fixed member fixed to the shaft portion on the one end side; and
an inward flange portion that is provided on the other end side and is buried in the seal portion, wherein a tip of the inward flange portion is provided so as to be positioned between a radially inward foremost end portion of the first inner peripheral convex portion and a radially inward foremost end portion of the second inner peripheral convex portion in an axial direction.

7. The dust cover according to claim 6, wherein a difference between an outer diameter of a part of the shaft portion on which the second inner peripheral convex portion slides and an inner diameter of the tip of the inward flange portion is larger than a difference between the outer diameter and an inner diameter of the radially inward foremost end portion of the second inner peripheral convex portion.

8. The dust cover according to claim 6, wherein the dust seal portion has a dust lip that extends radially outwardly toward a surface side of the coupling member, and the dust lip satisfies $0.45 \leq T \div L \leq 0.6$, where T represents a width of a base of the dust lip, and L represents a length of the dust lip.

\* \* \* \* \*